US007080152B2

(12) United States Patent
Bodin et al.

(10) Patent No.: US 7,080,152 B2
(45) Date of Patent: Jul. 18, 2006

(54) BROADCAST USER CONTROLS FOR STREAMING DIGITAL CONTENT UNDER REMOTE DIRECTION

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 09/881,917

(22) Filed: Jun. 14, 2001

(65) Prior Publication Data

US 2003/0014530 A1     Jan. 16, 2003

(51) Int. Cl.
*G06F 15/16* (2006.01)

(52) U.S. Cl. ............... 709/231; 709/203; 715/513; 719/310

(58) Field of Classification Search ........ 709/200–205, 709/217–235; 719/310–318; 717/100–104, 717/114; 725/112; 715/513; 714/755, 759
See application file for complete search history.

(56) References Cited

OTHER PUBLICATIONS

Application Server Solution Guide, Enterprise Edition: Getting Started, Nusbaum, May 2000, Nusbaum et. al., pp. 1-45, 416 434.*

Java Media Framework API Guide, JMP 2.0 FCS, Nov. 19, 1999, Sun Microsystems, pp. 1-66, 109-135, 173-178.*

\* cited by examiner

*Primary Examiner*—John Follansbee
*Assistant Examiner*—Haresh Patel

(74) *Attorney, Agent, or Firm*—John Biggers; Mark S. Walker; Biggers & Chanian, LLP

(57) ABSTRACT

Broadcasting user controls for streaming digital content from a multiplicity of sources of digital information to a multiplicity of client devices, the method implemented in conjunction with a network of digital computers, at least one of the digital computers comprising a content server upon which embodiments are implemented in computer memory and upon at least one computer processor, embodiments including receiving from a remote director a director instruction, the director instruction comprising an identification of a selected user control; extracting, in dependence upon the director instruction, from a store of user controls, the identified selected user control; identifying, in dependence upon the director instruction, a data communications program that administers data communications between the content server and a client device; encoding through the data communications program, in dependence upon the selected user control, a new HTML document; and downloading, through the identified data communications program, the new HTML document to the client device.

57 Claims, 8 Drawing Sheets

BROADCAST USER CONTROLS FOR STREAMING DIGITAL CONTENT UNDER REMOTE DIRECTION

BACKGROUND OF THE INVENTION

1. Field of the Invention

The field of the invention is data processing, or, more specifically, methods, systems, and products for broadcasting user controls for streaming digital content under remote direction.

2. Description of the Related Art

Streaming digital content delivered to users via networks is a powerful way of delivery substantive content of entertainment, education, and business communications to users. In the current state of the art, however, the users themselves are required to control presentations of streaming digital content. Many prior art implementations of streaming video and audio, including for example, RealPlayer™ from RealNetworks, Inc., of Seattle, Wash., Apple's QuickTime™, and Microsoft's Windows Media Player, actually require user to have some kind of video viewer application open in order to control video streaming. User controls are simple, including the analogues for the controls found on VHS videotape recorders, Play, Pause, Stop, and the like. To the extent that user controls are possible in prior art, there are no provisions for system-level assignments, effects, or control over the scope or duration of user controls. To the extent that a user is enable to Play, Pause, or Stop, such controls endure for the entirety of a presentation with no chance of centralized limitations. Generally in prior art, it is not possible to control whether a user even is authorized to affect a presentation of streaming digital content, much less the extent to which a user is enabled to have such control.

During playback of a clip in such prior art devices, no director control is provided on the server side of the stream of digital content. Most prior art systems for formulating presentation of streaming digital content are oriented to formulating playback of clips recorded prior to their presentation over a network. To the extent that control systems exist for formulation and control of digitized output streams of live video and audio, such controls are expensive and specialized, typically requiring direct connection to particular servers, workstations, or other computers. There remains in the art therefore, a need for convenient, powerful, flexible, means of formulating and controlling streaming digital content.

SUMMARY

In summary, this specification discloses broadcasting user controls for streaming digital content from a multiplicity of sources of digital information to a multiplicity of client devices, embodiments implemented in conjunction with a network of digital computers, at least one of the digital computers comprising a content server upon which embodiments are implemented in computer memory and upon at least one computer processor, embodiments typically including receiving from a remote director a director instruction, the director instruction comprising an identification of a selected user control; extracting, in dependence upon the director instruction, from a store of user controls, the identified selected user control; identifying, in dependence upon the director instruction, a data communications program that administers data communications between the content server and a client device; encoding through the data communications program, in dependence upon the selected user control, a new HTML document; and downloading, through the identified data communications program, the new HTML document to the client device.

In typical embodiments the remote director comprises a computer coupled for data communications to the content server, the remote director further comprising a browser. In typical embodiments, the director instruction comprises a director URL, the director URL comprising an indication that the director URL is a user control broadcast instruction, the director URL further comprising an identification of the selected user control to be broadcast. In typical embodiments, the store of user controls comprises a multiplicity of user control data records each of which represents a single user control and each of which further comprises a user control URL. In typical embodiments, each user control data record further comprises a data element that identifies a computer program that gives effect to a user control.

In typical embodiments, extracting, in dependence upon the director instruction, from a store of user controls, the selected user control, further comprises searching a store of user controls for a user control identified in the director instruction. In typical embodiments, the director instruction further comprises a director URL, and extracting the selected user control further comprises searching a store of user controls for a user control identified in the director URL. In typical embodiments, identifying, in dependence upon the director instruction an identified data communications program that administers data communications with a client device further comprises executing a user control selection routine that itself is identified in the director instruction.

In typical embodiments, the director instruction further comprises a director URL, and wherein identifying, in dependence upon the director instruction, an identified data communications program that administers data communications with a client device further comprises executing a user control selection routine that itself is identified in the director URL. In typical embodiments, executing a user control selection routine further comprises passing to the user control selection routine a parameter identifying the selected user control. In typical embodiments, executing a user control selection routine further comprises passing to the user control selection routine a parameter identifying a subscription level. In typical embodiments, executing a user control selection routine further comprises passing to the user control selection routine a parameter identifying user preferences.

In typical embodiments, executing a user control selection routine further comprises passing to the user control selection routine a parameter identifying user demographics. In typical embodiments, executing a user control selection routine further comprises passing to the user control selection routine a parameter identifying a client device type. In typical embodiments, encoding, within the identified data communications program, in dependence upon the selected user control, a new HTML document, further comprises encoding the selected user control as a hyperlink and formulating the new HTML document to include the hyperlink.

In typical embodiments, the new HTML document comprises an old HTML document further including the hyperlink. In typical embodiments, the old HTML document is the HTML document that was displayed on the client device just before downloading the new HTML document to the client device.

In typical embodiments, the selected user control further comprises a duration. Manuy such embodiments include timing the duration of the user control. Typical embodiments include also restoring to the client device, after timing the duration of the selected user control, an old HTML document comprising an HTML document that was previously displayed on the client device before downloading the new HTML document to the client device.

This Summary is presented primarily in terms of method. In summary, additional aspects of the invention include many embodiments as systems, that is, computing devices or computer systems, as well as computer program products. The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION OF EXEMPLARY EMBODIMENTS

Introduction

Figure 1:
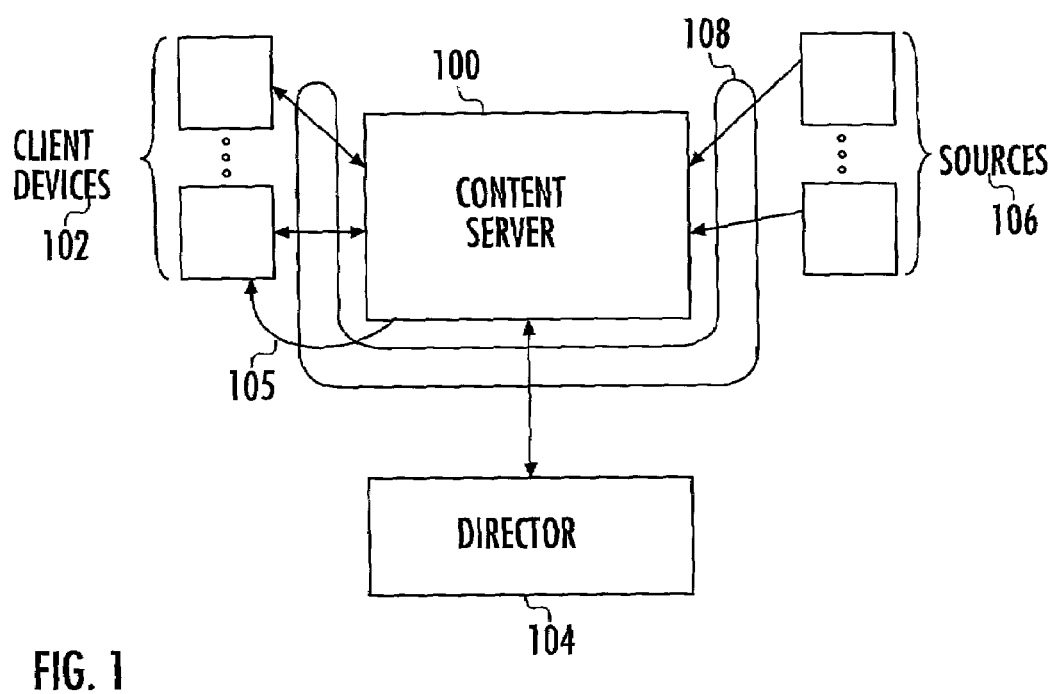
FIG. 1 is an overall block view of an embodiment of a system for remote direction of streaming digital content.

The present invention is described primarily in terms of methods for remote directions of networked streaming digital content presentations. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute" are used as synonyms, referring to individual elements of digital date. Aggregates of data elements are referred to as "records" or "data structures." Definitions of complex data structures that include member methods, functions, or software routines in addition to data elements are referred to as "classes." Instances of complex data structures are referred to as "objects" or "class objects."

"API" refers to an application program interface. APIs are standard sets of routines, protocols, and tools for building software applications.

The terms "client," "client device," and "device" are used as synonyms in this specification, referring to any device capable of accessing a server through a network. Examples of client devices are personal computers, special purpose devices that are internet-enabled, internet-capable personal data organizers, and others that will occur to those of skill in the art. Various embodiments of client devices are capable of wired and/or wireless network access. The use as a client device of any instrument capable of accessing a server through a network is well within the present invention.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling from client devices to one or more content servers is well within the scope of the present invention.

The term "servlets" refers to software modules that extend request/response-oriented servers, such as Java-enabled web servers. For example, a servlet might be responsible for taking data in an HTML order-entry form and applying the business logic used to update a company's order database. Servlets are to servers what applets are to browsers. Unlike applets, however, servlets have no graphical user interface. Servlets can be embedded in many different servers because typical servlet APIs assume nothing about a server's environment or protocol. As a practical matter, servlets are most widely used within HTTP servers, and many web servers support Java servlet technology.

"CGI" refers to the standard Common Gateway Interface for implementation of server scripts. Servlets are an effective replacement for CGI scripts. Servlets provide a way to generate dynamic documents that is both easier to write and faster to run. Servlets also address the problem of doing server-side programming with platform-specific APIs: they are developed with a Java Servlet API, a standard Java extension. In this fashion, in typical embodiments of the present invention, servlets are used to handle HTTP requests issued through browsers from client devices.

In conjunction with multithreading technology, which is strongly supported in Java for example, servlets are very supportive of collaboration among people. A single servlet can handle multiple requests concurrently, and can synchronize requests. Servlets can forward requests to other servers and servlets, so that servlets can be used to balance load among several servers that mirror the same content, and to partition a single logical service over several servers, according to task type or organizational boundaries.

"URL" means Universal Resource Locator, the standard method of associating world wide web data locations with network addresses for data communications. Many embodiments of the invention function by associating URLs with Java member methods in servlets on content servers, the member methods being called, run, invoked, or activated by invocation of associated URLs. In fact, some standard forms of URL are capable of directly identifying servlets, member methods within servlets, and providing data parameters for use in calls to member methods in servlets. Such URLs are typically invoked through areas of display screens in client devices, the display screen areas being activated for receipt of mouse clicks, gestures, shortcuts, keystrokes on keyboards, or other physical indications of URL selection or invocation.

Servlet URLs can be used in HTML tags, where, for example, would otherwise be found URLs for CGI scripts or URLs identifying file locations on web sites. Servlet URLs are used, for example, as destinations of HTML anchors, as actions in HTML forms, and as locations to be used when HTML META tags direct that HTML pages be refreshed.

"World Wide Web," or more simply "the web," refers to the well-known system of internet protocol ("IP") servers that support specially formatted documents, documents formatted in a language called HTML for HyperText Markup Language. The term "web" is used in this specification also to refer to any server or connected group or interconnected groups of servers that implement the HyperText Transport Protocol, "HTTP," in support of URLs and HTML documents, regardless whether such servers or groups of servers are coupled to the world wide web as such.

HTML supports hyperlinking URLs connecting to other documents as well as graphics, audio, and video. Hyperlinks support changing documents by invoking URLs through "hot spots." In this specification, the term "hot spot" is used to refer to any area of a display, the area being associated with a particular URL, which area is sensitive to physical indications of invocation, including for example, mouse clicks on radio buttons and shortcut graffiti gestures on scratch pads of personal data organizers such as Palm Pilots™.

DETAILED DESCRIPTION

This specification discloses example embodiments of methods, systems, and products for controlling and delivering digital content to a number of clients. In typical embodiments, the clients need not control separate digital content feeds but rather will get a consistent feed based on the preemption and routing of the digital feeds from a content server. In typical embodiments, a director controls the content server, and most embodiments support as a director any device that can attain network access. More specifically, there is in typical embodiments no requirement that the director be a terminal directly coupled to the content server.

Typical embodiments of the inventive methods and systems provide means for distributing any form of digital content from any digital media to any number of web clients while maintaining a control mechanism by a remote director. This control mechanism or director further supports changing digital content sources and streams, and changing attributes such as frame rates, so as to provide seamless presentations to any number of clients. Typical embodiments of the director mechanism allow for a hands-off approach in terms of the client devices. Users in typical embodiments are not required to operate any controls on client devices but rather can simply view the contents of the streaming presentation. The dynamic arrangement of content is not limited to streaming media within a user interface but also extends to transient control facilities that can be broadcast and invoked on any tier of client devices. The broadcast control facilities in typical embodiments are any control used to augment the user experience through the client devices and as stated are typically transient in nature, changed or removed under director control.

Referring to FIG. 1, an aspect of the invention is seen as a system for remote direction of streaming digital content from a multiplicity of sources (106) of digital information to a multiplicity of client devices (102) implemented upon a network (108) of digital computers, at least one of the digital computers comprising a content server (100) upon which system is implemented in computer memory and at least one computer processor. The example embodiment of FIG. 1 includes means for broadcasting user controls (105) for streaming digital content.

Figure 2:
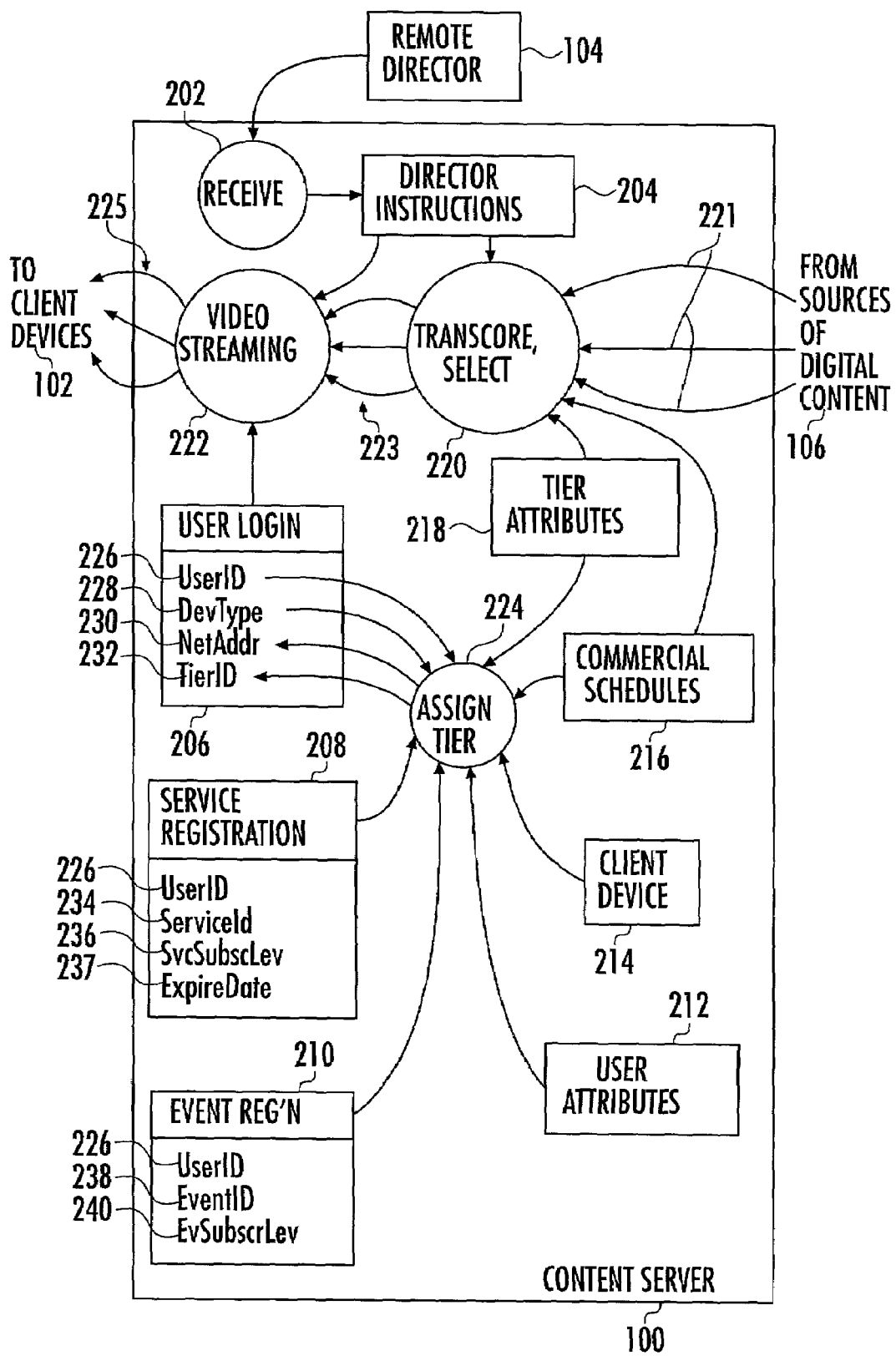
FIG. 2 is a process flow diagram illustrating several example embodiments of methods of remote direction of streaming digital content.
Figure 2B:
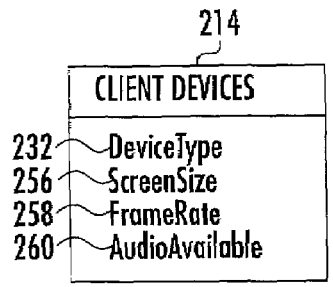
FIG. 2b is a data structure diagram of exemplary embodiments of attributes of client devices.

A more detailed example embodiment is shown in FIG. 2 as including a method of remote direction of streaming digital content. The example of FIG. 2 includes also receiving (221) digital content from sources (106), the digital content having many different digital formats. Examples of digital formats useful with various embodiments of the invention include JPEG, MP3, MPEG, GIF, HTML, text, XML, and the like. Other digital formats for digital content will occur to those of skill in the art, all of which formats are useful with embodiments of the present invention.

A further embodiment shown in FIG. 2 includes receiving (202), from a remote director (104), and storing in computer memory, remote director instructions (204), the remote director instructions including instructions for selections of digital content for inclusion in an output stream. The illustrated embodiment further includes transcoding (220) the digital content from sources into digital content having streaming format (223).

The illustrated embodiment also includes in at least one output stream (225), in dependence upon the remote director's instructions, digital content having streaming format. The illustrated embodiment, as do typical embodiments, includes communicating through a data communications network to at least one client device (102) the output stream (225).

In typical embodiments, client devices comprise client device attributes, and transcoding includes transcoding in dependence upon the client device attributes. More specifically, for example, transcoding includes in typical embodiments transforming digital data content to conform to a device's screen size, color requirements, or audio availability. Client device attributes typically include, for example, device type, screen size, frame rate, and audio availability.

In typical embodiments, transcoding includes transforming JPEG images into streaming format. In many embodiments, transcoding includes transforming a digitized digital content feed from a video camera into streaming format. In many embodiments, transcoding includes transforming a digitized video feed from a video camera into streaming format for a particular screen size or a particular frame rate. Transcodings including other data transformations as will occur to those of skill in the art. Any transformation of digital content is well within the scope of the present invention.

In many embodiments, the remote director (104) comprises a personal computer coupled through a network to the content server (100), and the method in many embodiments includes sending from the remote director to the content server remote director instructions (204). In many embodiments, sending director instructions includes invoking through URLs displayed on a terminal of the remote director member methods of servlets installed on the content server, each URL invoking a single servlet member method, each servlet programmed to administer threads of execution to carry out remote director instructions. In many embodiments servlets comprise member methods in Java objects, and invoking a servlet, or invoking a servlet member method, means to call a public member method in a Java object. In many embodiments, the member methods are implemented as Java thread-level URL dispatch routines. Remote director instructions typically comprise at least one instruction to select for transcoding and streaming digital content from a specific source.

More specifically, for example, servlet URLs are typically implemented in the following form:
browser url="http://myIP:8080/servlet/myservlet?parm1=parameter1
browser url="http://myIP/myservlet?parm1=1&parm2=2

The following is a typical example of an embodiment of servlet structure represented in pseudocode:

```
import javax.servlet.*;
import javax.servlet.http.*;
public class myservlet extends HttpServlet
{
    public void init(ServletConfig conf) throws ServletException
    {
        super.init(conf);
        ...
    }
    public void service(HttpServletRequest req,
    HttpServletResponse res) throws
            IOException { }
    public void destroy( ) { }
}
```

The following is a typical example of a computer program, in this particular example, a Java member method implemented as a Java thread-level URL dispatch routine and depicted in the following pseudocode:

```
public void service(HttpServletRequest req,
HttpServletResponse res) throws
        IOException
{
    request = req.getParameter("request");
    if(request.equalsIgnoreCase("view"))
        getView( );
    if(request.equalsIgnoreCase("reset"))
        reset( );
}
```

Figure 4A:
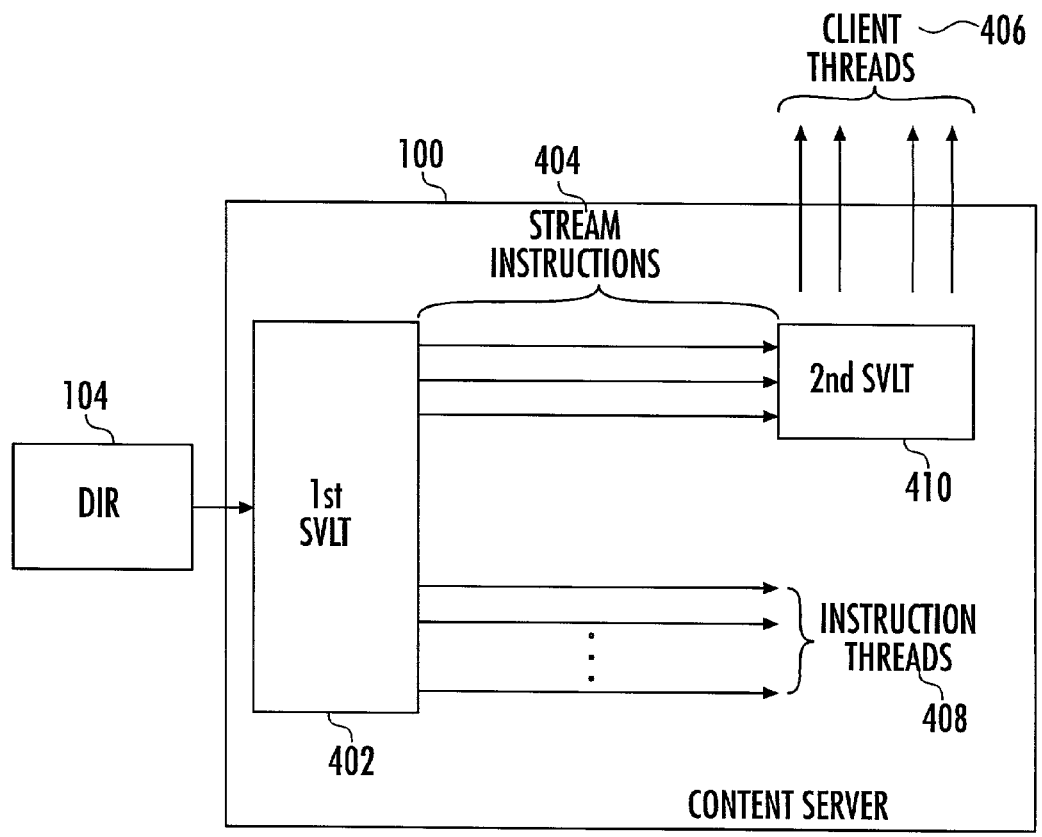
FIG. 4a illustrates an example embodiment of an alternative servlet architecture.
Figure 4B:
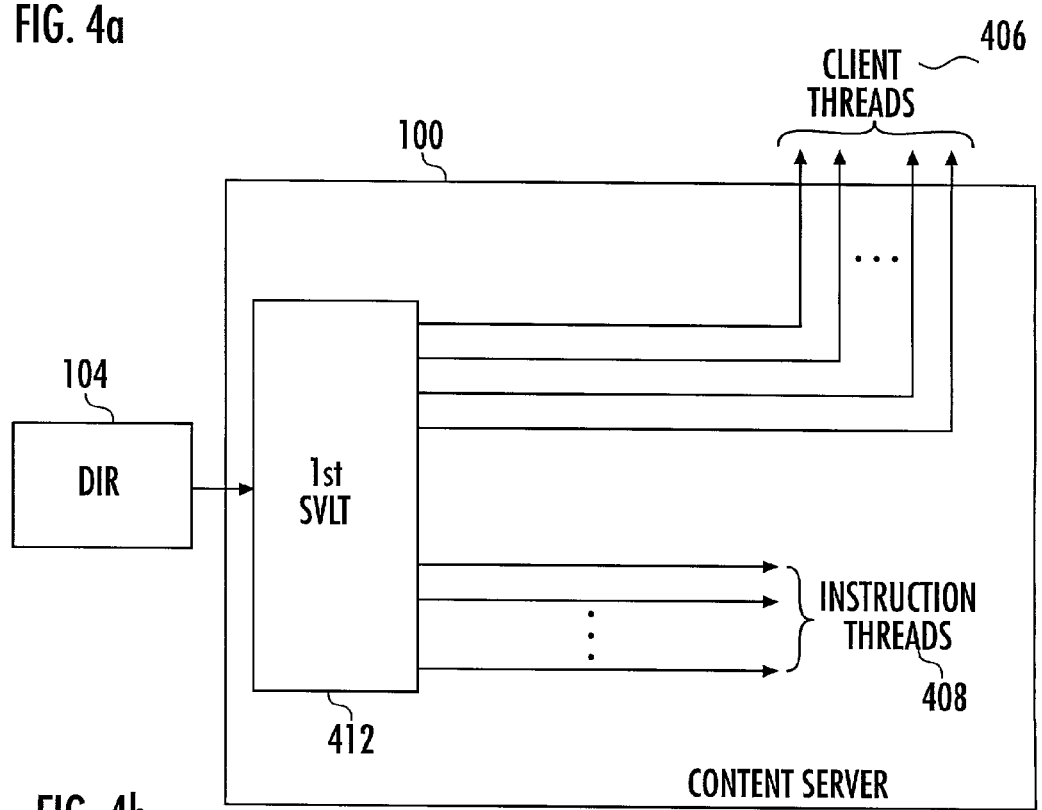
FIG. 4b illustrates an example embodiment of an alternative servlet architecture.

FIGS. 4a and 4b illustrated embodiments of alternative servlet architectures. The example embodiment shown in FIG. 4a includes a director (104) coupled for data communications to a first servlet wherein the first servlet administers threads of execution for remote director instructions (408). The example architecture of FIG. 4a includes also a second servlet (410), the second servlet being configured to administer threads of execution which themselves carry out data communications with individual client devices. In typical embodiments, each thread of execution for a client device (406) is assigned to a particular client device located on a network by an internet protocol address known to the thread. In the example architecture of FIG. 4a, the first servlet is coupled to the second servlet for communication of data and for communication of instructions by calls to member methods within the second servlet. In the example architecture of FIG. 4a, the coupling between the two servlets is accomplished through threads of execution administered by the first servlet. In embodiments of this kind it is typical that each thread would be assigned responsibility for carrying out one remote director instruction regarding control of the streams of digital content communicated to client devices by use of the client communications threads of the second servlet. Further alternative embodiments of inter-servlet communications and control will occur to those of skill in the art, all such embodiments being well within the scope of the present invention.

FIG. 4b illustrates an alternative example embodiment of servlet architecture useful with the present invention. In the example embodiment of FIG. 4b, both the threads for client communications (406) and the threads for execution of remote director instructions (408) are implemented through a single servlet (412). Alternative example architectures include implementation of an additional servlet administering threads of execution for data conversion and transcoding, or an additional servlet administering threads of execution for selecting particular sources of digital content for particular output streams. Further alternative embodiments of servlet architecture will occur to those of skill in the art, all such embodiments being well within the scope of the present invention.

It is useful to note that in typical embodiments, there is no required physical difference between the director and the client devices. Both are often personal computers coupled for data communications through a network to a content server. What distinguishes the director in typical embodiments is that the director in logging on to the server is accorded access through URLs to member methods to which access is restricted to users having director privileges. In many embodiments, only one director is allowed access at any particular time, to reduce the risk of conflicting director instructions, although there is no particular exclusion within the invention itself of allowing more than one director coupled to a content server.

Many embodiments of the present invention include registering a user for a service, the service being identified by a service identification code. FIG. 2 at reference 208 shows an example embodiment of a data structure representing a user's registration for a service, including a user identification code (226), a service identification code (234), and a service subscriber level (236). The service subscriber level is included in the illustration because many embodiments associate fee structures and levels of service with service subscription levels. Services typically comprise aggregations of digital content streamed through one or more websites to users through client devices over an extended period of time. Indeed, in typical embodiments, the services themselves are not time-limited, although the user's service registrations often are (237). User's service registrations are often time-limited because fee structures impose time limits on the service registrations as such, although such time limits to not affect the services themselves.

Typical embodiments include logging in a user for the access to a service. Logging in a user typically includes assigning values to user login attributes (206), including for example, user identification (226), device type (228), network address (230), and a tier (232). The user identification typically is determined through a login prompt. The device type in typical embodiments is derived from a browser header at logon. The network address in many embodiments is an internet protocol address, in many embodiments used to comprise a socket.

Figure 2A:
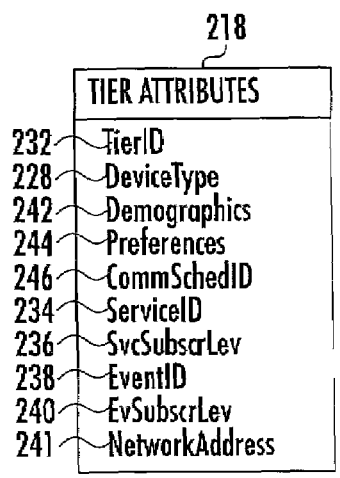
FIG. 2a is a data structure diagram of exemplary embodiments of attributes of tiers.

The tier is an identifier for a group of client devices identified according to grouping factors such as, for example, device type, subscription level, user demographics or user preferences. Tiers in typical embodiments are identified in tier attribute data structures such as the one illustrated for example at reference 218 in FIG. 2. A more detailed example embodiment of a data structure representing a tier is illustrated at FIG. 2a, where an example tier is shown as including a tier identification code (232), a device type (228), a data element for user demographics (242), a data indication of user preferences (244), a commercial schedule identification code (246), a service identification code (234), a service subscriber level (236), an event identification code (238), and an event subscription level (240).

Demographics include such user attributes as age, residence location, income level, occupation, and other demographics as may occur to those of skill in the art. Embodiments using any demographic are well within the scope of the present invention. User preferences include attribute indicators of special needs in support of disabilities, content limitations such as exclusions of adult material, profane language, or depictions of violence, preferences regarding subjects of commercial messages, and other user preferences as occur to those of skill in the art. Embodiments using any attribute indicators of any user preference regarding digital content are well within the scope of the present invention.

Typical embodiments also include assigning a tier value in dependence upon the device type and the service identification code. In typical embodiments, director selection of digital content and transcoding are also dependent upon tiers. In typical embodiments, registering a user includes creating a service registration record (208) comprising service registration attributes comprising user identification (226), service identification (234), service subscription level (236), and service expiration date (237), and in such embodiments, assigning a tier value typically include assigning a tier value in dependence upon the service subscription level.

The director in such embodiments has the capability of formulating output streams according to tier. Thus an embodiment utilizing the example structure shown in FIG. 2a, has the capability of presenting digital content in one or more output streams comprising a particular tier, for example, for a hand-held, network-capable, personal data organizer having a screen size of 800×600 pixels (according to device type 228), with content filtered to exclude graphic violence (according to user preference 244), with commercial content filtered to include automobile advertisements (user preference), with commercial content further filtered to exclude automobile advertisements for automobiles costing less than $30,000 (demographics 242), with commercials scheduled so as to occur no more than once per half-hour (in dependence upon service subscription level 236). Typical director access to servlets on the content server means that director instructions issued at any time by invoking URLs with as little as a single mouse click, one digitizing pad gesture, or a single keystroke, seamlessly and immediately alter tier structure and therefore the presentation of digital content to users of client devices in a tier.

Typical embodiments also include communicating to at least one of the client devices an output stream (225). In such embodiments, communicating the output stream or streams further comprises communicating the output stream to the network address (230) associated with a user's login (206 on FIG. 2). It is useful to note that in many embodiments, the network address associated with a user's login is a network address, typically associated with a URL, through which digital content is provided for a tier, as at the example at reference (241) in FIG. 2a. That is, in such embodiments, as shown in FIG. 2, the tier assignment function (224) assigns to the user login (206) a tier (232) according to client device type (214), user attributes (212), commercial schedules (216), and service registrations (208) or event registrations (210).

Many embodiments that assign network addresses to tiers, as shown for example at reference 241 in FIG. 2a, do not use network addresses in user logins, because in such embodiments, the stream output to the user and the user's client device will be directed through the network address identified with the tier. Some embodiments do not use tiers; such embodiments typically therefore assign a network address to individual user logins. In many embodiments, the assigned network address, whether it is assigned directly through a user login or indirectly through a tier structure, identifies a URL to which the client device browser is directed at login, the URL identifying a website location through which an output stream for the tier is delivered to client devices associated with user logins having the same assigned tier.

Figure 2E:
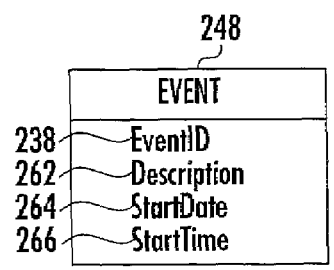
FIG. 2e is a data structure diagram of exemplary embodiments of attributes of events.
Figure 2C:
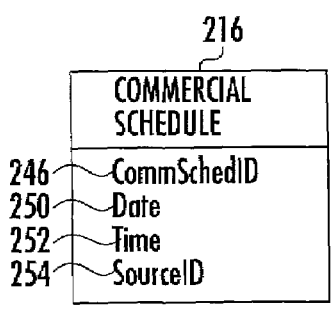
FIG. 2c is a data structure diagram of exemplary embodiments of attributes of commercial schedules.
Figure 2D:
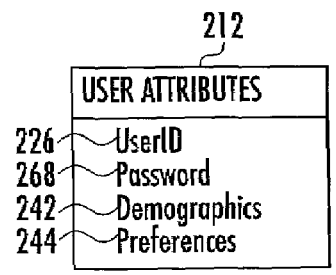
FIG. 2d is a data structure diagram of exemplary embodiments of attributes of users.

Turning again to FIG. 2, an additional example embodiment is shown as including registering a user for an event (210). Event registrations (210) typically include attributes for user identification (226), event identification (238), and event subscription level (240). Events are aggregations of digital content presented through networks to client devices, the events having a start date (264) and a start time (266), that is, a defined approximate beginning time, events typically being identified as shown in the example of FIG. 2e, by an event identification code (238). Events typically aggregate at least at least one output stream and at least one source.

The invention itself does not necessarily require event codes as such, although most embodiments do employ some means, such as event codes, of associating the aggregate of sources comprising an event. Alternative ways of identifying an aggregate of sources includes, for example, listing the sources in a list and using a single server for an event in which all sources available to the server are considered sources for an event. Events in typical embodiments are distinguished from services by possession of a starting time and typically also a defined duration, or an approximate duration, whereas services typically are ongoing for undetermined durations.

Embodiments comprising events typically include logging in users for the event, logging in users typically including assigning values to user login attributes (206), the user login attributes typically including user identification (226), device type (228), network address (230), and a tier identification (232).

In embodiments including events, tier values typically are assigned in dependence upon event identification codes (240). Many embodiments that include events also assign tiers in dependence upon event subscription levels (240). Of course many such embodiments also assign tiers in dependence upon device types, demographics, or user preferences.

Figure 3:
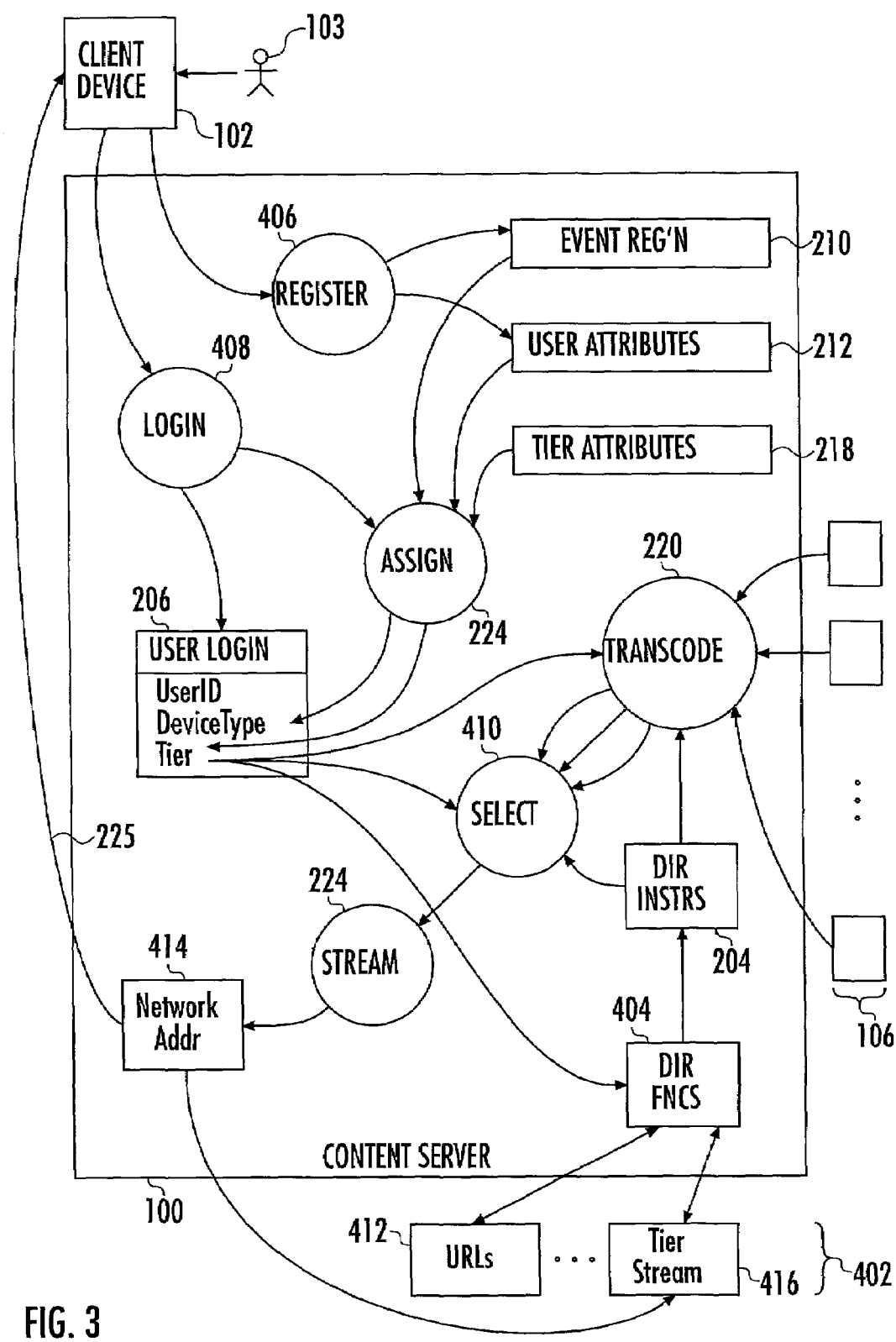
FIG. 3 is an example embodiment illustrated as a use case.

Turning now to FIG. 3, an embodiment of the method of the present invention is illustrated as a use case for an event comprising a football game. In the illustrated embodiment of FIG. 3, a user (103) through a client device (102) registers (406) for an event. The use in the illustrated case has no previous service registration, is therefore unknown to the content server, and user attributes (212), including preferences and demographics, are therefore gathered at registration. Registering for this previously unknown user includes assigning to the use a user identification code.

After registering for the event, either prior to or after the event begins, the user logs in (408) to view the event. At login, the user login record (206) is created and assigned (224) a device type and a tier. The device type is either taken from a default device type stored in user attributes at the time of registration, or is taken from a browser header at the time of login. The tier is assigned by matching user attributes with tier attributes among more than one tier record and selecting a tier whose demographics, user preferences, and device type match or approximately match the user's demographics, user preferences, and/or device type.

Now in the illustrated embodiment of FIG. 3, transcoding (220) and digital content selection (410) for an output stream for the tier are all accomplished in dependence upon the tier value so assigned. If, for example, the tier assigned on the basis of device type and user attributes has attributes including a device being a high definition video screen, no preferences as to language, violence, or adult content, and demographics of high income bracket, an output stream having digital content meeting these requirements is formulated by transcoding and selecting digital content in response to director instructions. The output stream (225) so formulated is communicated (224) in the illustrated embodiment to the user (103) through the client device (102) from the network address (414) associated by the tier (218) with the output stream (225).

If after registration no tier exists that is a good match for the user attributes, a new tier is created having attributes that well match user attributes. Creating a new tier merely includes typing in through a keyboard, for example, into a new tier record, a new set of tier attributes including a network address or URL through which an output stream formulated in accordance with the new tier attributes is communicated to client devices. In typical embodiments the quality of match between tier attributes and user attributes is determined according to tier selection criteria. Many formulations of tier selection criteria will occur to those of skill in the art. Any tier matching criteria used with any embodiment of the invention are well within the scope of the invention.

In the illustrated embodiment of FIG. 3, the software functions (404) associated with a director are stored in a content server (100). Coupled through a network for data communication to the content server in the illustrated embodiment are several personal computers comprising director workstations (402). In typical embodiments of this kind, at least one of the director workstations (416) is configured to present output streams formulated for tiers in dependence upon director's instructions. In such embodiments, at least one of the director workstations (412) is configured to present for invocation through a user interface URLs that in turn invoke director functions or member methods comprising director functions such as servlets that when invoked or called issue or comprise director instructions for transcoding and selecting digital content to formulate of an output stream.

In typical embodiments that include events, selections effected by director instructions are dependent upon the tier, and transcoding includes transcoding in dependence upon the tier. Director instructions for selection of digital content and transcoding in dependence upon tier result in output streams formulated and presented according to tier, and in such embodiments, communicating to client devices the output stream includes communicating the output stream to a network address associated with a user login. As described above, typical embodiments utilizing events assign the network address for communication of output streams through the tier (reference 241 on FIG. 2a).

Figure 5:
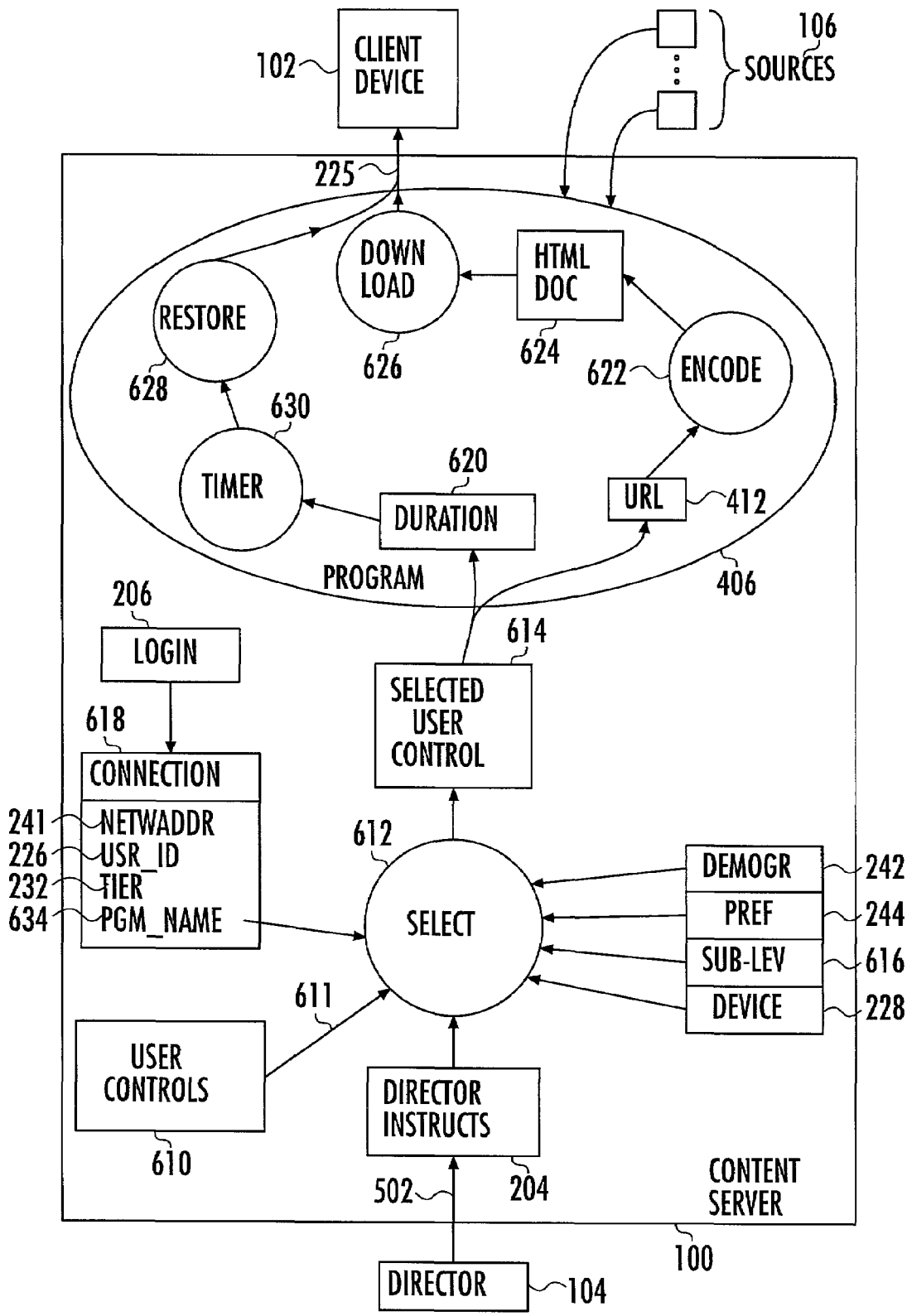
FIG. 5 is a process flow diagram illustrating typical embodiments.

Turning now to FIG. 5, a further aspect of the invention is seen as a method of broadcasting user controls for streaming digital content from a multiplicity of sources of digital content (106) to at least one client device (102), the method implemented in conjunction with a network of digital computers, at least one of the digital computers comprising a content server upon which the steps of the method are implemented in computer memory and upon at least one computer processor. In typical embodiments, the content server is a web server, a server designed to accept URLs from client devices operating browsers and respond to the URLs by providing documents identified in the URLs or executing computer programs identified in the URLs.

In an embodiment illustrated in FIG. 5, the method includes receiving (502) from a remote director (104) a director instruction (204) comprising an identification of a selected user control. The illustrated embodiment further includes extracting (611), in dependence upon the director instruction, from a store of user controls (610), the identified selected user control (614).

The illustrated embodiment further includes identifying in dependence upon the director instruction, a data communications program (406) that administers data communications between the content server (100) and a client device (102). The embodiment illustrated in FIG. 5 further includes encoding (622) through the data communications program, in dependence upon the selected user control (614), a new HTML document (624) and downloading (626), through the identified data communications program (406), the new HTML document (624) to the client device (102).

In typical embodiments of the kind illustrated in FIG. 5, the remote director (104) is a computer coupled (502) for data communications to the content server (100). In many embodiments, the remote director includes a browser. In typical embodiments, the director instruction comprises a director URL, and the director URL includes an indication that the director URL is a user control broadcast instruction and the director URL further includes an identification of the selected user control to be broadcast.

More specifically, for example, a director URL of the following example form:

<a href="\\content_server\servlet1.broadcast_user_
control?usr_ctl_id=X123&tier=Y246>Click Here To
Take Some Action</a> indicates the user control broadcast by identifying for execution a Java member method within a Java servlet that is in fact implement to broadcast user controls. That is, the example director URL identifies for execution a member method named "broadcast_user_control" in a member method named "servlet1" on the server named "content_ server." The member method "broadcast_user_control" is passed a parameter "usr_ctl_id=X123," identifying the exact user control to be broadcast, and is also passed a parameter "tier=Y246," indicating that the user control is to be broadcast to every client device in the tier identified by the tier identification code Y246.

Figure 6C:
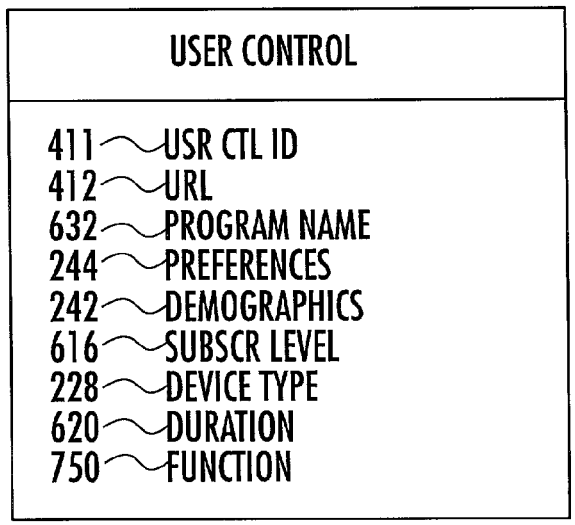
FIG. 6c is a data structure diagram of an alternative exemplary embodiment of a user control.
Figure 6B:
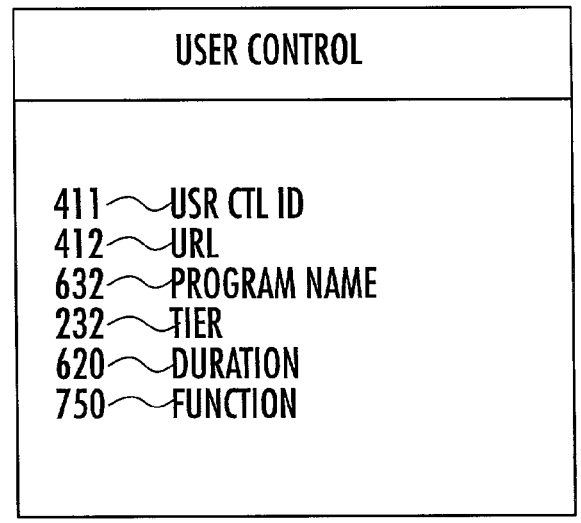
FIG. 6b is a data structure diagram of an alternative exemplary embodiment of a user control.
Figure 6A:
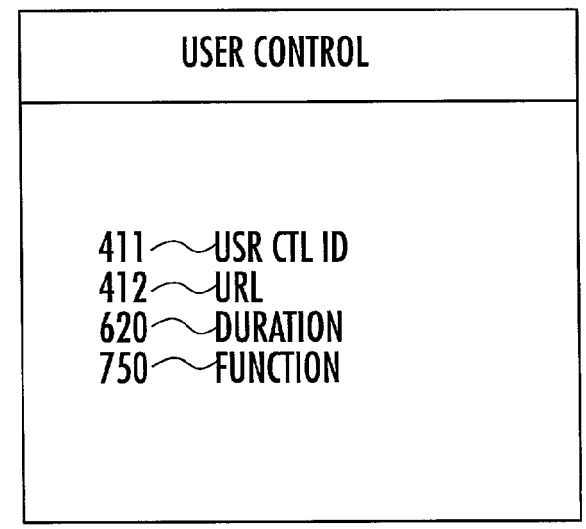
FIG. 6a is a data structure diagram of an alternative exemplary embodiment of a user control.

In typical embodiments, the store of user controls (610) includes a multiplicity of user control data records each of which represents a single user control and each of which further comprises a user control URL. FIGS. 6a, 6b, and 6c illustrate three alternatives embodiments of user control data records. In some embodiments, as those shown in FIGS. 6b and 6c, each user control data record further comprises a data element (632) that identifies a computer program that gives effect to a user control. In some embodiments, such as the one shown in FIG. 6c, the user control URL itself identifies a computer program that gives effect to a user control, and no separate data element is recorded for a computer program to give effect to a user control.

In typical embodiments, the step of extracting from a store of user controls the selected user control includes searching a store of user controls for a user control identified in the director instruction. In many embodiments, the director instruction is a director URL, and extracting the selected user control includes searching a store of user controls for a user control identified in the director URL. In some embodiments, a director URL provides a user control identification code (reference 411 on FIGS. 6a, 6b, 6c) for use in finding a particular user control. In other embodiments, a director URL provides a function value such as that shown for example at reference (750) in FIGS. 6a, 6b, and 6c.

In typical embodiments, identifying in dependence upon the director instruction an identified data communications program that administers data communications with a client device, includes executing a user control selection routine (612) that itself is identified in the director instruction. In more specific example embodiments, the director instruction further comprises a director URL, and identifying in dependence upon the director instruction, an identified data communications program that administers data communications with a client device, further comprises executing a user control selection routine that itself is identified in the director URL. The following example director URL "\\content_server\servlet1.broadcast_user_control"

identifies the computer program "broadcast_user_control" for execution as a user control selection routine.

In typical embodiments of the kind illustrated in FIG. 5, executing a user control selection routine includes passing to the user control selection routine a parameter identifying the selected user control. In many such embodiments, executing a user control selection routine further comprises passing to the user control selection routine a parameter identifying a subscription level, user preferences, user demographics, or a client device type. The following director URL, for example, effects execution of a user control section routine identified by a user control identification code and passes a parameter identifying a user demographic:

\\content_server\servlet1.broadcast_user_control?usr_ctl_id=X123&zip=10002

In typical embodiments of the kind illustrated, encoding (622) a new HTML document includes encoding the selected user control as a hyperlink and formulating the new HTML document (624) to include the hyperlink. In many embodiments, the new HTML document is an old HTML document with the new hyperlink inserted within it. In many such embodiments, the old HTML document is the HTML document that was displayed on the client device just before downloading the new HTML document to the client device.

More specifically, operation of typical embodiments in formulating a new HTML document is illustrated by the following pseudocode segment:

```
out.println(... +
  "<a href=\"" +
  response.encodeURL("/content_server/select_car_commercials ") +
    "\">Select Car Commercials</a>   " +
  ...);
```

Embodiments that include formulating new HTML documents in the fashion illustrated by this example pseudocode result in HTML pages output to a particular user device at a particular network address, the output HTML pages containing, for example, the following hyperlink:

<a href="/content_server/select_car_commercials>Select Car Commercials</a>

A data communications program implemented as a Java thread administering communications with a particular client device then, in such embodiments, transmits a new HTML page containing the example hyperlink to a browser on a client device and the phrase "Select Car Commercials" will appear in an invocable visual representation of the hyperlink, that is, an anchor, on the client device.

In embodiments of the kind under discussion, when a user invokes the hyperlink so created, a servlet on the content server will cause to be executed a software program identified by the hyperlink, in the example under discussion, the software program identified as "select_car_commercials." In some embodiments, the software program so executed is a CGI script or CGI binary executable. In this example embodiment, the software program so executed is a member method of a Java object. The software program identified as "select_car_commercials" is, in this example, a computer program designed and implemented so as to change the commercial schedule entry in the login user profile associated with the client device, in this case, changing the commercial schedule code from its previous value, whatever that value was, to a value conforming to the user's expressed wish to view automobile commercials rather than other categories of commercials available as streaming digital content.

In a further embodiment illustrated in FIG. 5, the selected user control includes a duration (620). Such embodiments typically include timing (630) the duration of the user control. Such embodiments typically also include restoring (628) to the client device, after timing the duration of the selected user control, an old HTML document, the old HTML document being an HTML document that was previously displayed on the client device before downloading the new HTML document to the client device.

Figure 7:
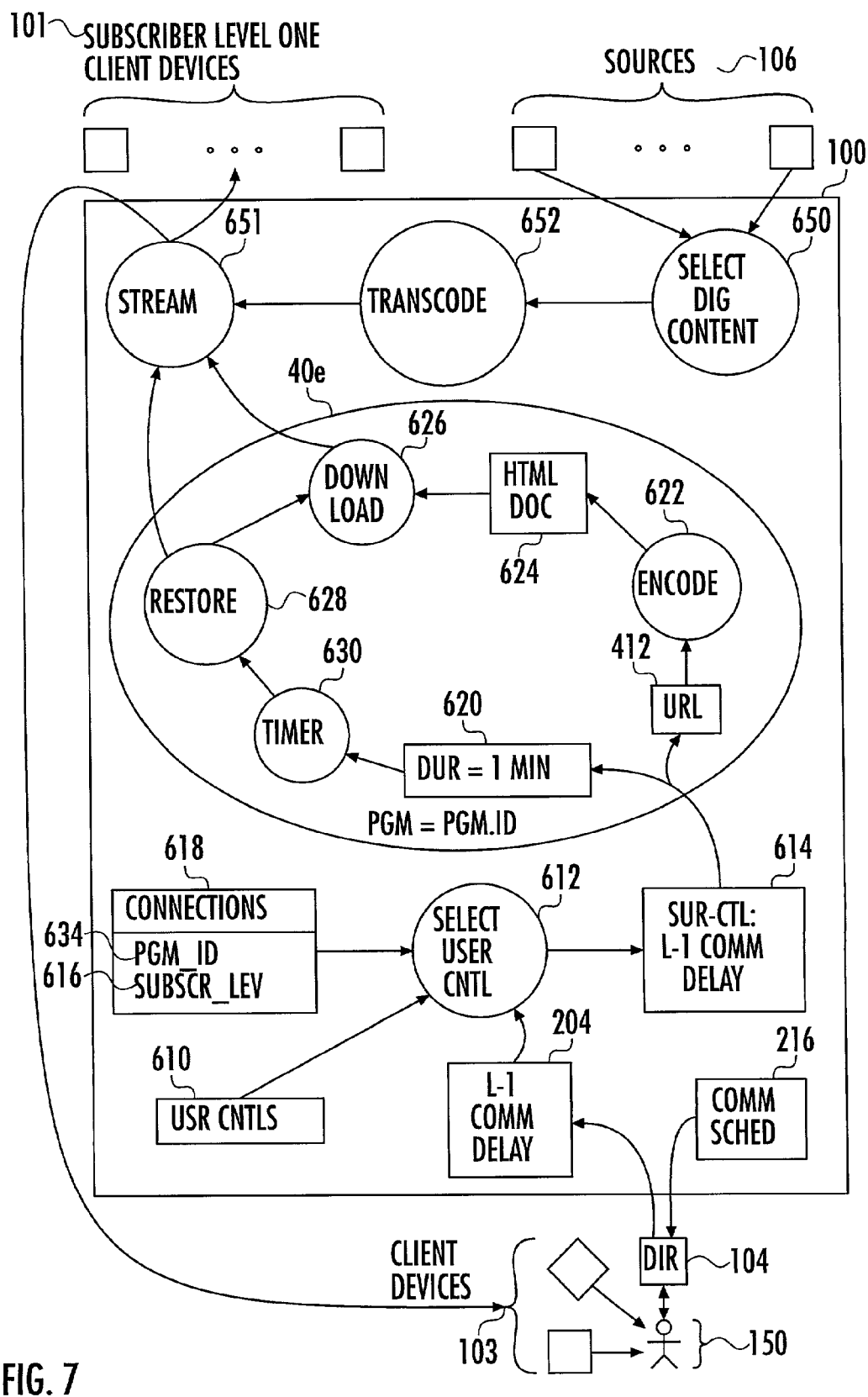
FIG. 7 is a process flow diagram illustrating typical embodiments.

Turning now to FIG. 7, further example embodiments of the invention are described on the basis of an example use case, a football game. The example use case includes sources of digital content (106) that in turn include several live digital video feeds from cameras viewing the game itself, one or more live digital video feeds from cameras viewing real time commentary, many still photographs of interest (of players, for example), live text feeds (as, for example, game or player statistics), and prerecorded video clips (as, for example, pre-game interviews with players, coaches, managers, owners, or fans), including prerecorded video clips of commercial messages from sponsors.

In the example use case, a human operator (150) has several computers, some configured as client devices viewing the streaming digital content of the football game (103) and at least one configured as a remote director (104). The operator's client devices are just like any other client devices: they are logged on to the content server as recipients of the streaming digital content of the football game, logged on with various subscription levels, user preferences, user demographics, and device types, so as to give the operator a view of the results of the operator's entry of director instructions through the remote director. The remote director (104) in the example use case is a computer workstation with a browser, the computer workstation coupled to the content server, the content server functioning as a web server, the browser displaying an HTML document that includes hyperlinks that include director URLs.

In the example use case, the operator notices on the operator's view of the game on the operator's client devices (103) that a big play is shaping up in the football game very near the time for a scheduled commercial message (216). The operator decides to allow level one subscribers to choose whether to delay receipt of the commercial until after the big play. The operator issues through the remote director a director instruction (204) to broadcast to level one subscribers a user control which when invoked through a browser on a client device will have the effect of delaying the next commercial for five minutes. The user control to be broadcast is ordered with a duration of one minute, meaning that users of client devices will have one minute to decide whether to delay the next commercial.

In the example use case, the director instruction is issued by invoking a hyperlink on the remote director. The hyperlink so invoked has, for example, the following HTML form:

<a href="\\content_server\servlet1.select_user_control?function=delay_commercial&subsc_lev=1&duration=1>
One Minute Commercial Delay For Level One Subscribers</a>

The example hyperlink has the effect of calling a computer program named "select_user_control" located in a Java servlet named "servlet1" within a content server named "content_server" and passing to the computer program the parameters: "function=delay_commercial", identifying the function of the user control; "subsc_lev=1," identifying the subscription level as level one; and "duration=1," identifying the duration of the user control as one minute. In FIG. 7, the computer program "select_user_control" is identified by reference (612).

In the example use case, the program for selecting a user control (612) extracts a user control from a store (610) in computer memory. The store has, for example in typical embodiments, the form shown in FIG. 6a, including for each user control represented by records in the store, a user control identification code (411), a user control URL (412), a duration (620), and a function (750). In this case, the user control selection program (612) extracts from a user control store (610) a user control having the function and the duration specified in the director instruction. Readers of skill in the art will realize that the invention itself does not necessarily require the duration to be stored in the user control records; in some embodiments it is passed along as a parameter in the selected user control (614). Either way, by the time the selected user control (614) is ready to be sent to the data communication program (406), it includes a duration if a duration is specified in the director instruction. Similarly, persons of skill in the art will realize that the inclusion of a user control identification code (411) is optional, not required by the invention itself, and often not used, particularly in embodiments for which the function code alone uniquely identifies a particular user control.

The user control selection program (612) in the example use case has a second function: it also to identifies the data communications programs (406) to receive the selected user control. For purposes of clarity in explanation, only one such data communications program is shown in FIG. 7, but in the example embodiment, there are many such data communications programs, one each for every client device logged on to the content server for the football game. In the example use case, the user control selection program identifies the data communications programs to receive the selected user control by searching a file of connection records (618). The file of connection records is prepared from logon data to include data communications program identification codes and subscriber levels for all client devices logged on for the football game. The user control selection program sends a copy of the selected user control (614) to each data communications program (416) identified by a program identification code (634) in a connection record (618) with a subscription level set to "1."

Each data communications program (406) that receives the selected user control encodes (622) the user control URL (412) from the selected user control into a hyperlink in a new HTML document (624) and downloads (626) the new HTML document to the client device served by the data communications program. This procedure causes to appear upon the browser screen for each client device (101) with subscription level one a new hyperlink anchor displaying for example: "Click Here To Delay The Next Commercial."

In those embodiments that utilize a separate thread of execution for each data communications program, sending the selected user control to the data communications programs typically involves writing the selected user control to one or more shared memory segments. In some embodiments only one write is needed, to a shared memory segment authorized for reading by many threads. Typically, even in embodiments that use a separate memory segment for each thread, no more than approximately one such write for each data communications program serving a client device with subscription level one is needed. Readers of skill in the art will recognize that such embodiments can broadcast a selected user control to a large number of client devices very, very quickly.

In the example use case, the duration of the selected user control (620) is provided to the data communications programs as part of the selected user control. The data communications programs typically time (630) the duration of the selected user control after downloading (626) the new HTML document and restore (628) an old HTML document after the duration of the user control. Typically the old HTML document does not contain the hyperlink for the selected user control. Restoring the old HTML document therefore has the effect of removing from the browser screen on the client devices the hyperlink anchor for the selected user control.

In the example use case, the encoded hyperlink for the selected user control as downloaded in the new HTML document has, for example, the form:

<a href="\\content_server\servlet1.delay_commercial?delay=5>
Click Here To Delay Commercials</a>

This example hyperlink when invoked from a client device has the effect of causing to be executed within the content server named "content_server" within the Java servlet named "servlet1" a member method named "delay_commercial" and passing to the member method the parameter "delay=5," identifying the delay of the commercial message as five minutes. The member method "delay_commercial" is programmed to delay a broadcast of a commercial message for five minutes. Alternative member methods for user controls include member methods programmed to, for example, change subscription levels, device types, device attributes, or user preferences. Persons skilled in the art will identify many ways to program such member methods, all such ways being well within the scope of the present invention.

Persons skilled in the art will realize that, although this specification describes content server actions in terms of Java servlet member methods, the same actions are alternatively carried out through CGI scripts or CGI binary executables. Persons skilled in the art can identify other ways of carrying out server actions in response to user controls or in response to remote director instructions, all such ways being well within the scope of the present invention.

It will be understood from the foregoing description that various modifications and changes may be made in embodiments of the present invention without departing from its true spirit. All exemplary embodiments described in this specification are mere examples, not limiting definitions of the invention. It is intended that descriptions in this specification are only for purposes of illustration and are not to be construed in a limiting sense. The scope of this invention should be limited only by the language of the following claims.

What is claimed is:

1. A method of broadcasting user controls of streaming digital content from a multiplicity of sources of digital information to a multiplicity of client devices, the method is implemented in conjunction with a network of digital computers, at least one of the digital computers comprising a content server upon which the steps of the method are implemented in a computer memory and upon at least one computer processor, the method comprising the steps of:
    receiving from a remote director a director instruction, the director instruction comprising an identification of a selected user control and a director URL that identifies a user control selection routine;
    extracting, in dependence upon the director instruction, from a store of user controls, the identified selected user control;
    identifying, in dependence upon the director instruction, a data communications program that administers data communications between the content server and a client device, including executing the user control selection routine identified by the director URL;
    encoding through the data communications program, in dependence upon the selected user control, a new HTML document; and
    downloading, through the identified data communications program, the new HTML document to the client device.

2. The method of claim 1, wherein the remote director comprises a computer coupled for data communications to the content server, the remote director further comprising a browser.

3. The method of claim 1 wherein the director instruction comprises a director URL, the director URL comprising an indication that the director URL is a user control broadcast instruction, the director URL further comprising an identification of the selected user control to be broadcast.

4. The method of claim 1 wherein the store of user controls comprises a multiplicity of user control data records each of which represents a single user control and each of which further comprises a user control URL.

5. The method of claim 4 wherein each user control data record further comprises a data element that identifies a computer program that gives effect to a user control.

6. The method of claim 1 wherein extracting, in dependence upon the director instruction, from a store of user controls, the selected user control, further comprises searching a store of user controls for a user control identified in the director instruction.

7. The method of claim 1 wherein the director instruction further comprises a director URL, and extracting the selected user control further comprises searching a store of user controls for a user control identified in the director URL.

8. The method of claim 1 wherein identifying, in dependence upon the director instruction an identified data communications program that administers data communications with a client device further comprises executing a user control selection routine that itself is identified in the director instruction.

9. The method of claim 1 wherein executing a user control selection routine further comprises passing to the user control selection routine a parameter identifying the selected user control.

10. The method of claim 1 wherein executing a user control selection routine further comprises passing to the user control selection routine a parameter identifying a subscription level.

11. The method of claim 1 wherein executing a user control selection routine further comprises passing to the user control selection routine a parameter identifying user preferences.

12. The method of claim 1 wherein executing a user control selection routine further comprises passing to the user control selection routine a parameter identifying user demographics.

13. The method of claim 1 wherein executing a user control selection routine further comprises passing to the user control selection routine a parameter identifying a client device type.

14. The method of claim 1 wherein encoding, within the identified data communications program, in dependence upon the selected user control, a new HTML document, further comprises encoding the selected user control as a hyperlink and formulating the new HTML document to include the hyperlink.

15. The method of claim 1 wherein the new HTML document comprises an old HTML document further including the hyperlink.

16. The method of claim 1 wherein the old HTML document is the HTML document that was displayed on the client device just before downloading the new HTML document to the client device.

17. The method of claim 1 wherein the selected user control further comprises a duration.

18. The method of claim 17 further comprising timing the duration of the user control.

19. The method of claim 18 further comprising restoring to the client device, after timing the duration of the selected user control, an old HTML document comprising an HTML document that was previously displayed on the client device before downloading the new HTML document to the client device.

20. A system for broadcasting user controls of streaming digital content from a multiplicity of sources of digital information to a multiplicity of client devices, the system is implemented in conjunction with a network of digital computers, at least one of the digital computers comprising a content server upon which the principal elements of the system are implemented, including a computer memory and at least one computer processor, the system comprising:

means for receiving from a remote director a director instruction, the director instruction comprising an identification of a selected user control and a director URL that identifies a user control selection routine;

means for extracting, in dependence upon the director instruction, from a store of user controls, the identified selected user control;

means for identifying, in dependence upon the director instruction, a data communications program that administers data communications between the content server and a client device, including executing the user control selection routine identified by the director URL;

means for encoding through the data communications program, in dependence upon the selected user control, a new HTML document; and means for downloading, through the identified data communication program, the new HTML document to the client device.

21. The system of claim 20, wherein the remote director comprises a computer coupled for data communications to the content server, the remote director further comprising a browser.

22. The system of claim 20 wherein the director instruction comprises a director URL, the director URL comprising an indication that the director URL is a user control broadcast instruction, the director URL further comprising an identification of the selected user control to be broadcast.

23. The system of claim 20 wherein the store of user controls comprises a multiplicity of user control data records each of which represents a single user control and each of which further comprises a user control URL.

24. The system of claim 23 wherein each user control data record further comprises a data element that identifies a computer program that gives effect to a user control.

25. The system of claim 20 wherein means for extracting, in dependence upon the director instruction, from a store of user controls, the selected user control, further comprises means for searching a store of user controls for a user control identified in the director instruction.

26. The system of claim 20 wherein the director instruction further comprises a director URL, and means for extracting the selected user control further comprises means for searching a store of user controls for a user control identified in the director URL.

27. The system of claim 20 wherein means for identifying, in dependence upon the director instruction an identified data communications program that administers data communications with a client device further comprises means for executing a user control selection routine that itself is identified in the director instruction.

28. The system of claim 20 wherein means for executing a user control selection routine further comprises means for passing to the user control selection routine a parameter identifying the selected user control.

29. The system of claim 20 wherein means for executing a user control selection routine further comprises means for passing to the user control selection routine a parameter identifying a subscription level.

30. The system of claim 20 wherein means for executing a user control selection routine further comprises means for passing to the user control selection routine a parameter identifying user preferences.

31. The system of claim 20 wherein means for executing a user control selection routine further comprises means for passing to the user control selection routine a parameter identifying user demographics.

32. The system of claim 20 wherein means for executing a user control selection routine further comprises means for passing to the user control selection routine a parameter identifying a client device type.

33. The system of claim 20 wherein means for encoding, within the identified data communications program, in dependence upon the selected user control, a new HTML document, further comprises means for encoding the selected user control as a hyperlink and means for formulating the new HTML document to include the hyperlink.

34. The system of claim 20 wherein the new HTML document comprises an old HTML document further including the hyperlink.

35. The system of claim 20 wherein the old HTML document is the HTML document that was displayed on the client device just before downloading the new HTML document to the client device.

36. The system of claim 20 wherein the selected user control further comprises a duration.

37. The system of claim 36 further comprising means for timing the duration of the user control.

38. The system of claim 37 further comprising means for restoring to the client device an old HTML document comprising an HTML document that was previously displayed on the client device before a downloading of the new HTML document to the client device.

39. A computer program product for broadcasting user controls of streaming digital content from a multiplicity of sources of digital information to a multiplicity of client devices, the computer program product is prepared for implementation in conjunction with a network of digital computers, at least one of the digital computers comprising a content server upon which the principal elements of the computer program product are implemented, including a computer memory and at least one computer processor, the computer program product comprising:

a recording medium;

means, recorded on the recording medium, for receiving from a remote director a director instruction, the director instruction comprising an identification of a selected user control and a director URL that identifies a user control selection routine;

means, recorded on the recording medium, for extracting, in dependence upon the director instruction, from a store of user controls, the identified selected user control;

means, recorded on the recording medium, for identifying, in dependence upon the director instruction, a data communications program that administers data communications between the content server and a client device, including executing the user control selection routine identified by the director URL;

means, recorded on the recording medium, for encoding through the data communications program, in dependence upon the selected user control, a new HTML document; and means, recorded on the recording medium, for downloading, through the identified data communication program, the new HTML document to the client device.

40. The computer program product of claim 39, wherein the remote director comprises a computer coupled for data communications to the content server, the remote director further comprising a browser.

41. The computer program product of claim 39 wherein the director instruction comprises a director URL, the director URL comprising an indication that the director URL is a user control broadcast instruction, the director URL further comprising an identification of the selected user control to be broadcast.

42. The computer program product of claim 39 wherein the store of user controls comprises a multiplicity of user control data records each of which represents a single user control and each of which further comprises a user control URL.

43. The computer program product of claim 42 wherein each user control data record further comprises a data element that identifies a computer program that gives effect to a user control.

44. The computer program product of claim 39 wherein means for extracting, in dependence upon the director instruction, from a store of user controls, the selected user control, further comprises means, recorded on the recording medium, for searching a store of user controls for a user control identified in the director instruction.

45. The computer program product of claim 39 wherein the director instruction further comprises a director URL, and means for extracting the selected user control further comprises means, recorded on the recording medium, for searching a store of user controls for a user control identified in the director URL.

46. The computer program product of claim 39 wherein means for identifying, in dependence upon the director instruction an identified data communications program that administers data communications with a client device further comprises means, recorded on the recording medium, for executing a user control selection routine that itself is identified in the director instruction.

47. The computer program product of claim 39 wherein means for executing a user control selection routine further comprises means, recorded on the recording medium, for passing to the user control selection routine a parameter identifying the selected user control.

48. The computer program product of claim 39 wherein means for executing a user control selection routine further comprises means, recorded on the recording medium, for passing to the user control selection routine a parameter identifying a subscription level.

49. The computer program product of claim 39 wherein means for executing a user control selection routine further comprises means, recorded on the recording medium, for passing to the user control selection routine a parameter identifying user preferences.

50. The computer program product of claim 39 wherein means for executing a user control selection routine further comprises means, recorded on the recording medium, for passing to the user control selection routine a parameter identifying user demographics.

51. The computer program product of claim 39 wherein means for executing a user control selection routine further comprises means, recorded on the recording medium, for passing to the user control selection routine a parameter identifying a client device type.

52. The computer program product of claim 39 wherein means for encoding, within the identified data communications program, in dependence upon the selected user control, a new HTML document, further comprises means, recorded on the recording medium, for encoding the selected user control as a hyperlink and means, recorded on the recording medium, for formulating the new HTML document to include the hyperlink.

53. The computer program product of claim 39 wherein the new HTML document comprises an old HTML document further including the hyperlink.

54. The computer program product of claim 39 wherein the old HTML document is the HTML document that was displayed on the client device just before a downloading of the new HTML document to the client device.

55. The computer program product of claim 39 wherein the selected user control further comprises a duration.

56. The computer program product of claim 55 further comprising means, recorded on the recording medium, for timing the duration of the user control.

57. The computer program product of claim 56 further comprising means, recorded on the recording medium, for restoring to the client device an old HTML document comprising an HTML document that was previously displayed on the client device before a downloading of the new HTML document to the client device.

* * * * *